United States Patent
Bhaggan et al.

(10) Patent No.: US 6,500,479 B2
(45) Date of Patent: Dec. 31, 2002

(54) FAT BLENDS WITH CRYSTAL MODIFIERS

(75) Inventors: Krish Bhaggan, Wormerveer (NL); Frederick William Cain, Wormerveer (NL); John Hugh Pierce, Sharnbrook (GB); Julia Sarah Rogers, Sharnbrook (GB); Ulrike Schmid, Wormerveer (NL)

(73) Assignee: Unilever Patent Holdings BV, Vlaardingen (NL)

( * ) Notice: Subject to any disclaimer, the term of this patent is extended or adjusted under 35 U.S.C. 154(b) by 27 days.

(21) Appl. No.: 09/780,478

(22) Filed: Feb. 12, 2001

(65) Prior Publication Data

US 2001/0038878 A1 Nov. 8, 2001

(30) Foreign Application Priority Data

Feb. 10, 2000 (EP) .............................................. 00301055

(51) Int. Cl.$^7$ ................................................ A23D 9/007
(52) U.S. Cl. ........................ 426/601; 426/607; 426/615
(58) Field of Search ................................ 426/601, 607, 426/608, 615

(56) References Cited

U.S. PATENT DOCUMENTS

| | | | |
|---|---|---|---|
| 4,606,911 A | * | 8/1986 | Hayashi et al. |
| 5,314,877 A | * | 5/1994 | Suzuki et al. |
| 5,948,460 A | | 9/1999 | Kang et al. .................. 426/548 |
| 6,153,208 A | * | 11/2000 | McAtee et al. |
| 6,190,678 B1 | * | 2/2001 | Hasenochrl et al. |
| 6,338,854 B1 | * | 1/2002 | Matsumoto et al. |

FOREIGN PATENT DOCUMENTS

| | | | |
|---|---|---|---|
| EP | 0 555 484 A1 | | 8/1993 |
| GB | 1161879 | * | 12/2001 |
| JP | 01039973 | | 2/1989 |
| JP | 05176712 | | 7/1993 |
| JP | 407258098 | * | 10/1995 |
| JP | 09040689 | | 2/1997 |
| JP | 409040689 | * | 2/1997 |
| JP | 09067249 | | 3/1997 |
| JP | 0774255 | * | 5/1997 |

OTHER PUBLICATIONS

Derwent Acc No. 1989–195626.*
Derwent Acc No. 1995–126097.*
Derwent Acc No. 1992–044319.*
Derwent Acc No. 1992–044320.*

* cited by examiner

Primary Examiner—Carolyn Paden
(74) Attorney, Agent, or Firm—Morgan, Lewis & Bockius LLP

(57) ABSTRACT

Blends containing a vegetable fat or a blend of vegetable fats and at least 0.1 wt % of a composition comprising ursolic acid and oleanolic acid in a weight ratio of 1:00 to 99:1 display a number of benefits such as high crystallization rates. This modification of the crystallization rate can be used to achieve a number of beneficial effects in the final fat blend or in the final food product containing the blend.

18 Claims, No Drawings

FAT BLENDS WITH CRYSTAL MODIFIERS

FIELD OF THE INVENTION

The invention relates to the modification of fats or fat blends so as to improve the crystallization characteristics thereof.

DESCRIPTION OF RELATED ART

Fats per se or in the form of fat blends often suffer from problems during crystallisation. E.g. the crystallisation rate often is low or the crystal form of the fats results into products that are not sufficiently hard or are difficult to filter.

In order to cope with this problem the prior art discloses to add crystal modifiers to the fats, such as polymers or hardened fat components. The polymers however are not food grade and thus have to be removed from the food product which is not always easy and, if possible at all, complicates the processing, adding to the costs and making the use thereof economically unattractive. Hardened fats are not always healthy because of their high content of saturated fatty acid and have a negative impact on the viscosity and mouthfeel of the products.

Moreover crystal modifiers that are effective and that simultaneously add health benefits to the food products have not been disclosed yet in the prior art.

BRIEF SUMMARY OF THE INVENTION

Therefore we studied whether we could find crystal modifiers that are effective for improving the crystallisation and the hardness of the product resulting therefrom and that simultaneously will add health benefits to the final food product. This study resulted in the finding that by adding a blend of ursolic acid and oleanolic acid to a fat per se or to a fat in a food product the crystallisation rate of the fat could be increased while simultaneously the hardness of the fat composition could be increased. Further it was found that the addition of the ursolic acid/oleanolic acid mixture also improved other properties of the total composition, such as oral mouthfeel; heat resistance; aeration properties and drying times (when applied in ice-cream coatings).

The known health effects of ursolic acid and oleanolic acid remain in the fat composition and/or the food product made thereof.

Health effects of ursolic acid and oleanolic acid can be found in eg JP 09/040689; JP 09.067249; CN 1085748; JP 1039973; JP 03287531; JP 03287530; EP 774255; JP 07258098; JP 07048260; JP 01132531; FR 2535203 and 10 JP 1207262.

Therefore our invention concerns in the first instance a blend of a vegetable fat and/or a blend of vegetable fats and at least 0.1 wt %, preferably 0.1 to 10 wt %, most preferably 0.2 to 5 wt % of a natural health composition, wherein the natural health composition comprises a mixture of ursolic acid and oleanolic acid in a weight ratio of 1:99 to 99:1, preferably 10:90 to 90:10, more preferably 75:25 to 25:75.

DETAILED DESCRIPTION OF THE INVENTION

It was found that very beneficial fat compositions could be obtained if the fat in above blend displays a solid fat content measured on a non-stabilised fat by NMR-pulse at the temperature indicated of: 5 to 90 at 5° C.; 2 to 80 at 20° C. and less than 15 at 35° C.

Non-stabilised being defined as a fat that has been subjected to the following temperature profile before measuring the fat content by NMR pulse: melt at 80° C. and cool to 0° C. and keep at 0° C. for 30 min, than warm up to measurement temperature and keep at that T for 30 min before measuring the N value. Very useful blends were obtained by making a blend comprising components A, B and C, wherein A=a natural health composition, comprising a mixture of ursolic acid and oleanolic acid in a weight ratio of 1:99 to 99:1

B=a solid fat with a solid fat content at 20° C. of at least 20, measured on the unstabilised fat by NMR-pulse, preferably at least 45, most preferably at least 60 and C=a fat with a content of fatty acids with 18 C-atoms with one to three double bonds of at least 40%, which components A, B and C are present in amounts of:

at least 0.1 wt % A, preferably 0.1 to 20 wt %, most preferably 0.2 to 10 wt %

8 to 90 wt % of B, preferably 25 to 75 wt %, most preferably 40 to 70 wt % and 0 to 85 wt % of C, preferably 15 to 65 wt %, most preferably 20 to 50 wt %.

Although fats B and C could be selected from a wide range of fats we prefer to use fats B that are selected from the group consisting of palm oil, palm oil fractions, cocoa butter, cocoa butter equivalents, palm kernel oil, fractions of palm kernel oil, hardened vegetable oils such as hardened palm oil, hardened fractions of palm oil, hardened soybean oil, hardened sunflower oil, hardened rape seed oil, hardened fractions of soy, rape or sunflower oil, mixtures of one or more of these oils and interesterified mixtures thereof.

Fats C that are most preferred are fats selected from the group consisting of sunflower oil, high oleic sunflower oil, olive oil, soybean oil, rape seed oil, palm oil olein, olein fractions from other vegetable oils, high oleic vegetable oils and cotton seed oil.

The natural health composition can contain ursolic acid and oleanolic acid as the only components (eg by mixing of these components isolated from natural sources) however we found that we could obtain better health effects without effecting the physical effects of the blend of ursolic acid and oleanolic acid in a negative sense if the health component also comprises isoflavonoids and/or flavonoids in particular in amounts corresponding with 0.005 to 5% of the total amount of ursolic acid and oleanolic acid.

Compositions containing the health components can be obtained from natural sources such as fruit skins, in particular skins of apples, pears, cranberries, cherries or prunes. All-spice oil is another natural source for ursolic acid/oleanolic acid mixtures. The health component can be obtained by extraction with a suitable organic solvent such as acetone.

Part of our invention are also food products having a fat phase in it and wherein the fat phase comprises at least partly the blends according to the invention. Examples of preferred food products are spreads (low fat or full fat), dressings, mayonnaises, cheese, creams, ice creams, ice cream coatings, confectionery coatings, fillings, sauces and culinary products.

Above food products preferably comprise 10 to 90 wt %, preferably 20 to 60 wt % of a continuous fat phase. The physical effects we describe above are the most pronounced in these products.

The modification in crystallisation behavior also results in a number of other effects that are also beneficial. Therefore our invention, according to another embodiment also comprises the use of a blend of ursolic acid and oleanolic acid in a fat blend per se or in a fat blend of a food product wherein the blend of ursolic acid and oleanolic acid is used to modify the crystallisation behavior of a fat blend or a fat blend in a final food product to (i) increase the hardness of the fat blend or final product and/or (ii) to improve the plasticity of the fat blend or final product and/or (iii) to improve oral mouthfeel of the fat blend or final product and/or (iv) to improve the heat resistance of the fat blend or final product and/or (v) to increase the speed of crystallisation of the fat blend or final product and/or (vi) to increase the aeration properties of the fat blend or final product and/or (vii) to decrease drying times of ice-cream coatings.

According to a last embodiment our invention also concerns a process to make a blend with the composition according to the invention, wherein (i) skins of a fruit such as apples, cherries, prunes, cranberries and pears are extracted with an organic solvent such as acetone (ii) an extract of a mixture of ursolic acid and oleanolic acid is isolated and after removal of the solvent a mixture containing ursolic acid and oleanolic acid is obtained this mixture of acids obtained in (ii) is blended with a fat in the ratios required to obtain the compositions according to the invention.

EXAMPLES

1. Three Blends Were Made with the Composition as Given Below:

| | FAT COMPOSITION | ADDITIVE | HARDNESS AT 20° C. | CRYSTALL RATE AT 15° C. |
|---|---|---|---|---|
| 1. | SF/hardstock 87/13 | no | 55.5 | 8% after 10 min |
| 2*. | SF/hardstock 87/13 | ursolic acid/ oleanolic acid ratio 60/40 2% | 81 | 11% after 10 min |
| 3. | SF/hardstock 87/13 | fully hardened palm oil 2% | 73 | 11% after 10 min |

*= according to invention
SF = sunflower oil
hardstock = interesterified mixture of hardened palm oil and hardened palm kernel oil.

The fat was melted at 60° C. and the additive was added and distributed homogeneously in the fat. Then the blend was stabilised for 15 min at 60° C. and cooled in a waterbath of 40° C. for 5 min. The mix was warmed to 15° C. and the solid fat content in the blend was measured with a time interval of 3 min for 30 min at 15° C. This led to the amounts of crystals formed which is an indication for the crystallisation rates as mentioned in above table.

The hardness of the fat obtained was measured at 20° C. using a standard Stevens equipment applying a penetration depth of 2 mm and a penetration speed of 0.5 mm per sec.

The fats (2) were found to have better hardness, better texture, better plasticity and processability than the fats (1) or (3) without the ursolic acid component.

2. Effects of Ursolic Acid Extract in an Ice Cream Coating

Experimental

The recipe for the ice cream coatings was the following:
475 g dark Callebaut 811
25 g Fat
Two different fats were used:
A 25 g CCB (reference)
B 10 g ursolic acid extract/15 g CCB
The following characteristics were determined by coating small magnum ice creams.
Dripping temperature (° C.)
Dripping time (s)
Drying time (s)
Coating weight as % of total weight
Flexibility Result & Discussion

TABLE 1

Summary of results

| Characteristic | Sample A | Sample B |
|---|---|---|
| Dipping temperature (° C.) | 40 | 40 |
| Dripping time (s) | 17 | 15 |
| Drying time (s) | 93 | 84 |
| Coating weight (%) | 40.7 | 45.3 |
| Flexibility[1] | −/+ | ++ |

[1]The flexibility was tested by hitting the ice cream on the table.

Flexibility index:

++ = does not break
+ = difficult to break
− = breaks
−− = breaks easily

Observations

The coatings A leaked ice cream through small holes in the coating.

Conclusion

Coating B have a shorter dripping time than coating A. Although the coating weight is higher (and thus coating is thicker) for coating B, the drying time is shorter than for coating A. The coating with the ursolic acid extract showed the least contraction after drying.

3. Processing of Margarine

Three margarines were produced under the same process conditions.

a) Formulation

| Aqueous Phase | |
|---|---|
| Water | 18.48% |
| Potassium Sorbate | 0.15 |
| Citric Acid | 0.07 |
| SMP | 1.0 |

| Fat Phase | |
|---|---|
| Fat Blend | 80.0 |
| Hymono 8903 | 0.3 |

Fat Phase:

Product 1. 12% INES*, 88% SF (Control)

Product 2. 12% INES*, 2% BO65, 86% SF

Product 3. 12% INES*, 2% ursolic acid extract, 86% SF

BO-65 is soybean oil hardend to m.pt 65° C.

*INES=Stearin fraction of interesterified palm oil stearin and palm kernel stearin b) Process Conditions The process line was configured as:

Premix–Pump–$A_1$-unit–$C_1$-unit–$A_2$-unit

Premix temperature was set at 60° C. and 60-rpm stirrer speed. All units were set to 15° C., with shaft speeds set to 1000 rpm. Throughput was 50 g/min. using the constant displacement pump.

For all products a coarse premix was prepared by slowly adding the prepared aqueous phase to the oil phase in the premix tank. A 2kg-batch size was employed Silverson mixing was applied for mixing of the powder into the fat phase prior to premix formation.

The mix was allowed to stir for 15 minutes before pumping was commenced. After pumping was started, the line was allowed to run for 15 minutes before any collection of product.

The following process parameters were noted:

| Product | $A_1$ exit (° C.) | $C_1$ exit (° C.) | $A_2$ exit (° C.) | Line Pressure (bar) |
|---|---|---|---|---|
| Control | 20.2 | 19.4 | 17.6 | 1.0 |
| 2% BO65 | 21.1 | 20.1 | 17.8 | 2.0 |
| 2% Ursolic Acid extract | 21.3 | 20.2 | 17.7 | 2.2 |

Three tubs of each product were collected. All tubs were placed at 5° C. After one day, one tub of each was transferred to each of 5°, 10° and 15° for evaluations after one week.

c) Product Assessment

All samples spread easily with no apparent water loss. Stevens hardness (C-value) was measured and conductivity measurements were performed. The findings are summarized below:

| | 5° C. Storage | |
|---|---|---|
| Sample | C-Value (g/cm$^2$) | Conductivity ($\mu$Scm$^{-1}$) |
| Control | 630 | <10$^{-5}$ |
| 2% BO65 | 710 | <10$^{-5}$ |
| 2% Ursolic Acid extract | 960 | <10$^{-5}$ |

| | 10° C. Storage | |
|---|---|---|
| Sample | C-Value (g/cm$^2$) | Conductivity ($\mu$Scm$^{-1}$) |
| Control | 410 | <10$^{-5}$ |
| 2% BO65 | 520 | <10$^{-5}$ |
| 2% Ursolic Acid | 560 | <10$^{-5}$ |

| | 15° C. Storage | |
|---|---|---|
| Sample | C-Value (g/cm$^2$) | Conductivity ($\mu$Scm$^{-1}$) |
| Control | 340 | <10$^{-5}$ |
| 2% BO65 | 500 | <10$^{-5}$ |
| 2% Ursolic Acid | 550 | <10$^{-5}$ |

Melting of the standard, 2% BO65 and 2% Ursolic Acid extract spreads was observed under microscope fitted with a temperature controlled stage. This indicated that the standard and 2% Ursolic Acid extract spreads melting in the same general temperature region (36° to 38° C.). The BO65 containing sample melted in the region of 43° to 45° C. That is, the Ursolic acid extract sample was not raised in melting point (and hence waxiness), but a large difference in hardness was noted compared to the standard. This is in contrast to the BO65 equivalent that was harder than standard, but at the cost of increased melting point (i.e. waxiness.).

4. Influence of Ursolic Acid in Chocolate

| Reference | 475 g dark Callebaut + 25 g CCB |
|---|---|
| M1 | 10 g PO60 in 25 g CCB added to 465 g dark Callebaut |
| M2 | 10 g Ursolic acid extract in 25 g CCB added to 465 g dark Callebaut |

PO-60 is hardend palm oil with m.pt 60° C.

Mixtures were tempered in a Leatherhead temper kettle at 30 ° C. using 0.1% chocolate as seeding crystals. The viscosity was measured at temper and bars were made.

| Results: | Ref | M1 | M2 |
|---|---|---|---|
| Tau0 30° C. | 8.7 Pa | 10.7 Pa | 10.1 Pa |
| Eta 30° C. | 1.2 Pas | 4.7 Pas | 2.0 Pas |
| Demoulding time | 8 min | 6 min | 8 min |
| Gloss | 3/4 | 3 | 3/4 |

Heat Resistance

Samples (solid chocolate bonbon) are stored during 15 hours at 40° C.

| Dimension at 20° C.: | 3.3 × 2.5 cm | Height 1.9 cm |
|---|---|---|
| Dimension at 40° C.: | Ref 4.0 × 4.3 cm | Height: 0.8–1.0 cm |
| | M1 4.0 × 3.8 cm | Height 1.0–1.2 cm |
| | M2 3.3 × 3.0 cm | Height 1.5–1.7 cm |

The highest heat resistance was observed with ursolic acid extract containing sample.

Hardness

The settings on the Stevens Texture Analyzer were: Distance: 2 mm Speed: 0.5 mm/sec.

|  | Temperature 20° C. | | | Temperature 25° C. | | | Temperature 30° C. | | |
|---|---|---|---|---|---|---|---|---|---|
|  | Ref | M1 | M2 | Ref | M1 | M2 | Ref | M1 | M2 |
| 1 day | 195 | 188 | 201 | 129 | 130 | 144 | 58 | 65 | 60 |
| 1 week | 195 | 184 | 206 | 167 | 165 | 164 | 53 | 62 | 61 |
| 1 month | 200 | 186 | 219 | 158 | 168 | 174 | 146 | 127 | 165 |
| 2 months | 198 | 188 | 232 |  |  |  |  |  |  |
| 3 months | 203 | 184 | 224 |  |  |  |  |  |  |

The chocolate with ursolic acid extract were found to have better hardness at all temperatures between 1 to 3 month of storage.

Effects of Ursolic Acid Extract on Aeration Properties

Experimental

The coatings were aerated for 20 minutes by using the Hobart N-50.

The samples were measured for density and hardness.

Coating A: 475 gram Callebaut 811+10 gram PO60+15 gram CCB

Coating B: 475 gram Callebaut 811+10 gram Ursolic acid+15 gram CCB

Results

Density measurement: The coating was weighed in a metal cup with a known volume of 90 cm³. A summary of the data is given in the table below. The density can than be calculated with the formula:

$$\text{Density} = \frac{\text{mass (gram)}}{\text{volume (cm}^3\text{)}}$$

Hardness Measurement

The aerated coating was kept at 20° C. for 2 days before measurement. The settings on the Stevens Texture Analyzer were:

Distance :2 mm

Speed: 0.5 mm/sec.

A summary of the hardness (load in grams) is given in the table as well.

Results

|  | Coating A | Coating B | Units |
|---|---|---|---|
| Mass before aerating | 111.5 | 110.3 | gram |
| Density before aerating | 1.24 | 1.23 | g/cm³ |
| Mass after aerating | 106.1 | 105 | gram |
| Density after aerating | 1.18 | 1.17 | g/cm³ |
| Air | 4.8 | 4.8 | % |
| Hardness | 188 | 199 | gram |

Conclusion

In both coatings the same amount of air was determined after aeration whereas the hardness of the aerated coating with ursolic acid extract was found to be higher.

What is claimed is:

1. A blend of at least one vegetable fat and at least 0.1 wt % of a natural health composition, wherein the natural health composition comprises a mixture of ursolic acid and oleanolic acid in a weight ratio of 1:99 to 99:1 and wherein the fat displays a solid fat content measured on a non-stabilised fat by NMR-pulse at the temperature indicated of: 5 to 90 at 5° C.; 2 to 80 at 20° C. and less than 15 at 35° C.

2. Blend according to claim 1 wherein the blend comprises components A, B and C, wherein A=a natural health composition comprising a mixture of ursolic acid and oleanolic acid in a weight ratio of 1:99 to 99:1

B=a solid fat with a solid fat content at 20° C. of at least 20, measured on the unstabilized fat by NMR-pulse, and C=a fat with a content of fatty acids with 18 C-atoms with one to three double bonds of at least 40%, which components A, B and C are present in amounts of:

at least 0.1 wt % A, 8 to 90 wt % of B, and 0 to 85wt % of C.

3. Blend according to claim 2, wherein fat B is selected from the group consisting of palm oil, palm oil fractions, cocoa butter, cocoa butter equivalents, palm kernel oil, fractions of palm kernel oil, hardened vegetable oils such as hardened palm oil, hardened fractions of palm oil, hardened soybean oil, hardened sunflower oil, hardened rape seed oil, hardened fractions of soy, rape or sunflower oil, mixtures of one or more of these oils and interesterified mixtures thereof.

4. Blend according to claim 2, wherein fat C is selected from the group consisting of sunflower oil, high oleic sunflower oil, olive oil, soybean oil, rape seed oil, palm oil olein, olein fractions from vegetable oils, high oleic vegetable oils and cotton seed oil.

5. Blending according to claim 2 wherein B is a solid fat with a solid fat content at 20° C. of at least 45 measured on the unstabilised fat by NMR-pulse and components A, B and C are present in the amounts of 0.1 to 20 wt % of A, 25 to 75 wt % of B and 15 to 65 wt % of C.

6. Blending according to claim 2 wherein B is a solid fat with a solid fat content at 20° C. of at least 60 measured on the unstabilised fat by NMR-pulse and components A, B and C are present in the amounts of 0.2 to 10 wt % of A, 40 to 70 wt % of B and 20 to 50 wt % of C.

7. Blend according to claim 1 wherein the natural health composition also comprises isoflavonoids and/or flavonoids in amounts corresponding with 0.005 to 5% of the total amount of ursolic acid and oleanolic acid.

8. Blend according to claim 1 wherein the natural health composition is obtained from fruit skins.

9. Blend according to claim 8, wherein the fruit skins are selected from the group consisting of the skins of apples, pears, cranberries, cherries and prunes.

10. Food products with a fat phase wherein the fat phase comprises at least partly the blend according to claim 1.

11. Food products according to claim 11, wherein the food product is selected from the group consisting of spreads (low fat or full fat), dressings, mayonnaises, cheese, creams, ice creams, ice cream coatings, confectionery coatings, fillings, sauces and culinary products.

12. Food products according to claim 11, wherein the food product comprises 10 to 90 wt % of a continuous fat phase.

13. Food products according to claim 12 wherein the food product comprises 20 to 60 wt % of a continuous fat phase.

14. A process for making a blend according to claim 1, comprising (i) extracting the skins of a fruit selected from the group consisting of apples, cherries, prunes and pears with an organic solvent,
(ii) removing the solvent from the extract to isolate the mixture of ursolic acid and oleanolic acid; and
(iii) blend the mixture of acids obtained in (ii) with a fat in the ratios required to obtain the composition according to claim 1.

15. Blend according to claim 1 containing 0.1 to 10 wt % of said natural health composition and the weight ratio of ursolic acid to oleanolic acid is 10:90 to 90:10.

16. Blend according to claim 1 containing 0.2 to 5 wt % of said natural health composition and the weight ratio of ursolic acid to oleanolic acid is 75:25 to 25:75.

17. Method to modify the crystallisation behavior of a fat blend per se or a fat blend in a final food product which comprises incorporating an effective amount of a blend of ursolic acid and oleanolic acid in the fat blend per se or in the fat blend of a food product to thereby modify the crystallisation behavior of said blends.

18. The method of claim 17 wherein the blend of ursolic acid and oleanolic acid is incorporated in the fat blend per se or fat blend of a final food product to modify crystallisation behavior and thereby provide said fat blends or final food product with at least one of the following: increased hardness, improved plasticity, improved oral mouthfeel, improved heat resistance, increased speed of crystallisation, increased aeration properties and decreased drying times for ice-cream coatings.

* * * * *